Feb. 9, 1937.      G. BROWNING      2,069,939
COFFEE MAKER
Filed Dec. 30, 1935
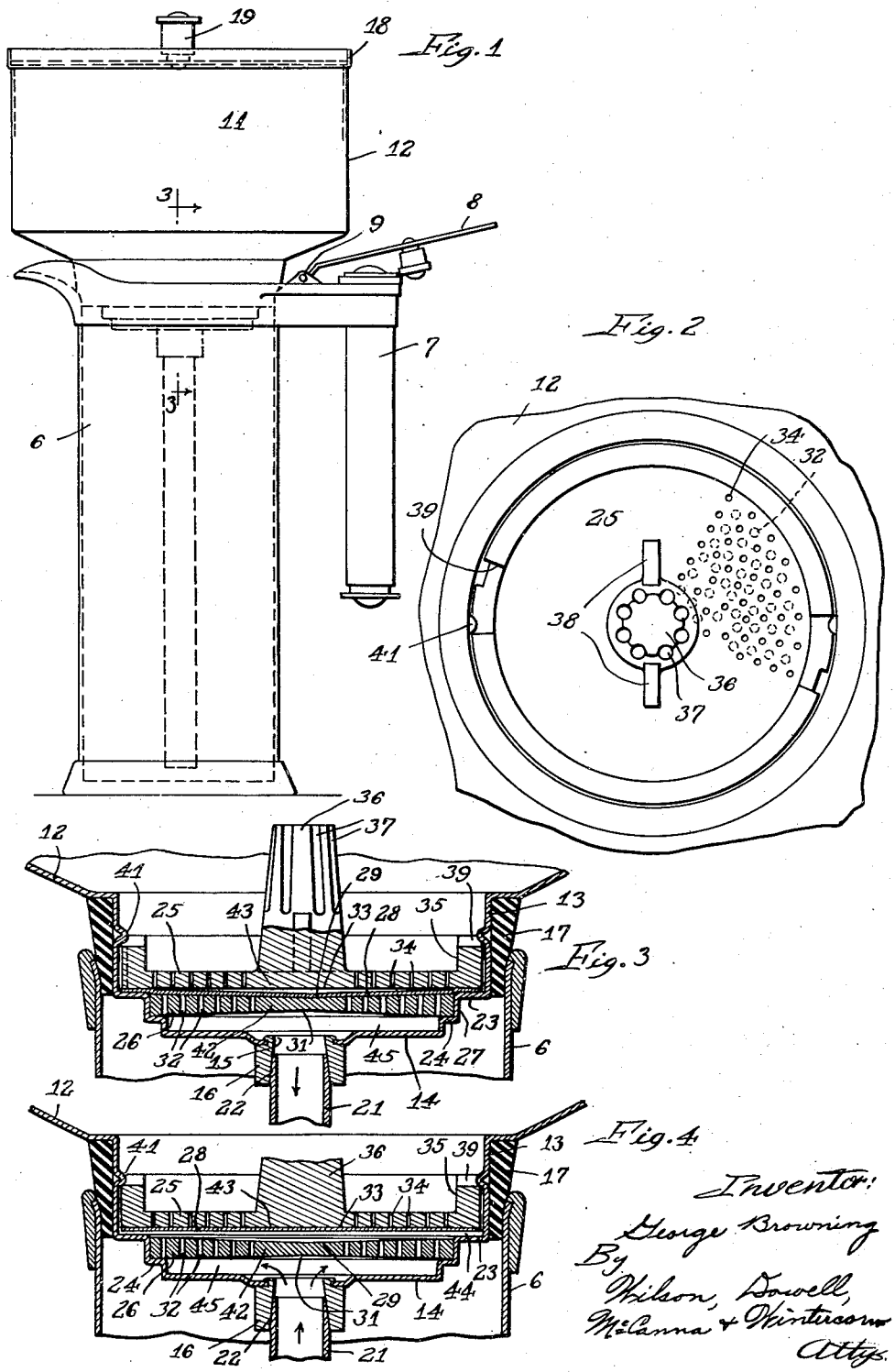
Inventor:
George Browning
By
Wilson, Bowell,
McCanna & Winterson
Attys.

Patented Feb. 9, 1937

2,069,939

UNITED STATES PATENT OFFICE 2,069,939

COFFEE MAKER

George Browning, Chicago, Ill., assignor to Chicago Flexible Shaft Company, Chicago, Ill., a corporation of Illinois Application December 30, 1935, Serial No. 56,661

10 Claims. (Cl. 53—3)

This invention relates to coffee makers, and has special reference to those of the vacuum type.

Among the more important objects of the invention are the provision of a vacuum type coffee maker wherein the coffee is filtered through a paper filter to produce a clear brew; wherein the paper, being cheap, may be discarded after use; wherein the filter paper is held between perforate plates having staggered perforations, one of which plates has concave surfaces and both of which plates are shaped and supported in a manner to cause the filter paper to act as a flap valve to permit rapid upward movement of water and a relatively slow downward filtration of the coffee.

Other objects and advantages will be apparent from the following description and the accompanying drawing, in which—

Figure 1 is a side view of a coffee maker embodying the invention;

Fig. 2 is a top view of the brew top with the cover removed;

Fig. 3 is a fragmentary section on the line 3—3 of Figure 1 showing the position of the filter paper during the downward filtration of the brew, and Fig. 4 is a section similar to Fig. 3 showing the position of the filter paper as the water moves upward into the brew top.

The coffee maker in this instance consists of a coffee pot designated generally by the numeral 6 having a handle 7 and a cover 8, the cover being pivoted at 9 to move from the position shown in Figure 1 to a position closing the top of the pot. A brew top designated generally by the numeral 11 is positioned in the top opening of the pot 6 and consists of a chamber 12 having a cylindrical lower portion 13 (Fig. 3) and a bottom 14 provided with a central opening 15 surrounded by an internally tapered flange 16. A gasket 17 of rubber or other resilient material fits onto the cylindrical portion 13 so that the brew top may be forced down into the upper end of the pot 6 to provide a substantially air-tight fit. The chamber 12 may be flared slightly at the top as shown at 18 for the reception of a cover 19 to enclose the top of this chamber. A tube 21 having a tapered upper end 22 adapted to fit into the flange 16 extends from the flange downward to a point adjacent the bottom of the pot 6. It will be recognized that the brew top 11 together with the tube 21 is adapted to be seated in the top of the pot 6 within which has previously been placed the required amount of water for the brewing of the coffee and after the coffee has been made the brew top and tube are removed from the coffee pot and the coffee served or dispensed from the pot as is common in the vacuum type coffee maker.

The side walls of the cylindrical portion 13 are stepped inwardly as shown in Figs. 3 and 4 to provide annular ledges 23 and 24. Upper and lower perforated plates 25 and 26 respectively seat on the annular ledges 23 and 24. It will be noted that the radius of the wall portion 27 connecting the steps 23 and 24 is smaller than the radius of the wall portion at the outer edge of the step 23 and likewise the perforated disks are of different radius. A filter paper 28 of substantially the radius of the upper plate 25 is positioned with its edge on the step 23 and between the perforated plates. The upper surface 29 and lower surface 31 of the lower plate 26 are each concave as shown in Figs. 3 and 4. This permits the lower plate 26 to be inserted with either face upward while still retaining a concave upper surface. This concave upper surface allows the water passing upward through the pipe 21 and through perforations 32 in the lower plate 26 to be distributed over the entire lower surface of the filter paper since the filter paper will be moved upward by the rush of water, against the lower face of the upper plate 25 as shown in Fig. 4.

The upper plate 25 has preferably a plane lower surface 33 perforated as shown at 34, upstanding annular side walls 35 adapted to fit closely against the side walls of the cylindrical portion 13 and a central upstanding boss 36 having suitable grooves 37 and wings 38 serving as a knob or hand hold for inserting and removing the plate. The side walls 35 are provided with bayonet slots 39 adapted to cooperate with projections 41 on the side walls for the purpose of locking the upper plate in position, as shown in Fig. 3. Preferably when the upper plate is rotated to its locked position it should be capable of a small amount of vertical movement, such, for example, as between the position shown in Figs. 3 and 4 in order to permit the upwardly surging water to pass along the outer edges of this plate into the chamber 12. The plate 26 is solid through its center as shown at 42, and the top plate 25 is likewise solid in this area as shown at 43, these areas lying directly above the upper end of the tube 21. In this wise the upward surge of water is distributed over substantially the entire surface of the plate and the danger of breaking the filter paper is largely eliminated.

The perforations in the plates 25 and 26 are so arranged that regardless of the relative rotative positions of the two plates, the perforations thereof cannot come into registration. This is accomplished by arranging the perforations 34 in the top plate in a series of circular rows which are so positioned as to be spaced radially between a like series of circular rows of perforations in the lower plate 26, as shown in Figs. 2, 3, and 4. Through this means and through the concave surfaces 29 and 31 on the lower plate 26 it will be seen that the upwardly moving water, which travels at a considerable speed, is caused to be distributed through the space between the two plates, which space is indicated by the numeral 44 in Fig. 4. This space is created in part by the concave face of the lower plate and in part by movement of the upper plate upward under the force of the water. Under these circumstances it will be seen that the pressure along the entire lower face of the upper plate is substantially uniform so that there is no tendency to break the filter paper at the holes. Likewise the upward movement of the upper plate permits the water to surge upward around the outer edges of this plate.

Fig. 4 shows the parts in the position occupied when the water is moving upward from the pot 6 into the chamber 12. The water passes up through the tube 21 and is discharged into a chamber 45 between the bottom 14 and the plate 26. This chamber serves to distribute the water over the total plate surface. It then passes through the perforations 32 in the plate 26 into the area 44 causing the upper plate 25 to move into the position shown in Fig. 4, the filter paper 28 moving upward against the lower surface of the upper plate so that the water can pass upward past the edges of the filter paper and the upper plate at a relatively rapid speed. When the full amount of water has been displaced from the pot 6 into the chamber 12, the supply of heat to the pot is cut off in the usual manner and the condensation of the vapors in the pot causes the water to be drawn back into the pot. The position of the parts during this operation is shown in Fig. 3. It will be seen that the upper plate 25 has now been drawn down against the ledge 23. The filter paper 28 being of substantially the same radius is then pinched between the plate 25 and the ledge 23 along its annulus, thus preventing fluid from passing downward around the edges of the upper plate. Furthermore, the partial vacuum in the pot draws the filter paper down tight at the inner edge of the ledge 23 so as to effectively seal the parts against movement of liquid downward around the edges of the filter paper. A partial vacuum also draws the filter paper firmly against the upper surface of the plate 26 so that the concave face of the lower plate 26 causes a space between the lower face of the plate 25 and the filter paper for the distribution of the liquid over the entire upper face of the filter paper. It will thus be seen that the filter paper acts somewhat like a flat valve around its edges. When the water rushes upward the edges of the paper lift, as shown in Fig. 4, to allow a large percentage of the water to pass around the edges thereof, thus putting less strain on the paper. Likewise when the coffee starts moving downward, the edges of the paper drop into the position shown in Fig. 3 to form a tight seal against the top ledge.

Through this arrangement a practically clear coffee is made, the filter paper removing the fine particles which normally give the brewed coffee its cloudy appearance. The filter paper is held against displacement in either direction by being positioned between two perforate plates. Locking means is provided to prevent the upward rush of water from displacing the filter. The perforations of the two plates are staggered in the radial direction so as to eliminate the necessity for locating means for the lower plate.

While I have thus described and illustrated a specific embodiment of my invention I am aware that numerous alterations and changes may be made therein without departing from the spirit of the invention or the scope of the appended claims, in which—

I claim:

1. The combination in a vacuum type coffee maker of upper and lower chambers, a tube connecting the bottom of the upper chamber with the lower chamber for conducting liquid between said chambers, an annular step in said upper chamber adjacent the bottom thereof, a filter paper spanning said chamber and overlapping said step at its edges, an upper perforate plate seated loosely on said step and confining the edges of said paper, said plate being of such weight as to be lifted by the upward surge of liquid for the passage of liquid along its annulus and a lower perforate plate for supporting the central portion of said paper.

2. The combination in a vacuum type coffee maker of upper and lower chambers, a tube connecting the bottom of the upper chamber with the lower chamber for conducting liquid between said chambers, an annular step in said upper chamber adjacent the bottom thereof, a filter paper spanning said chamber and overlapping said step at its edges, an upper perforate plate seated on said step and confining the edges of said paper, means for retaining said plate for limited vertical movement under the influence of a rising stream of liquid to permit passage of the liquid upward past the edges of the plate and paper, and a lower perforate plate for supporting the central portion of said paper.

3. The combination in a vacuum type coffee maker of a coffee chamber and a brew chamber, means interconnecting said chambers for the passage of liquid therebetween, a pair of annular steps in said brew container arranged in inwardly stepped relationship, upper and lower perforate plates shaped to seat on said steps, and a filter paper positioned between said plates and overlapping the upper step at its edges, the perforations in said plates being arranged in concentric rows, the rows of the two plates being out of registration, one of said plates having a concave surface facing said paper providing a narrow distributing space therebetween for movement of the filter between the opposed faces of the plates dependent upon the direction of liquid flow.

4. The combination in a vacuum type coffee maker of upper and lower chambers, means on the bottom of said upper chamber for conducting fluid between the chambers, said upper chamber having a pair of annular steps adjacent the bottom thereof, a lower perforate plate adapted to seat on the lower of said steps, said plate having a concave upper surface, an upper perforate plate adapted to seat loosely on the upper of said steps and be unseated by the entry of fluid in said upper chamber, and a filter paper adapted to seat on its edges on the upper of said steps and be confined at its edge between said step and said upper plate, the central portion thereof bearing against the bottom of said upper plate during the movement of fluid into said upper container to function in the unseating of said plate and moving to bear against said concave surface during the movement of fluid downwardly to the lower chamber to function in the filtration of the fluid.

5. The combination in a vacuum type coffee maker of upper and lower chambers, means on the bottom of said upper chamber for conducting fluid between the chambers, said upper chamber having a pair of annular steps adjacent the bottom thereof, a lower plate adapted to seat on the lower of said steps, said plate having concave upper and lower surfaces, an upper plate adapted to seat on the upper of said steps, a filter paper adapted to seat along its edges on the upper of said steps and be confined between said step and said upper plate, and means for retaining said upper plate for limited vertical movement under the influence of upwardly moving liquid to permit the liquid to pass upward between the edges of the upper plate and the filter paper and the walls of the chamber and to drop onto the step under the influence of downwardly moving liquid to confine the edges of the filter paper and prevent the passage of liquid along the edges of the filter paper.

6. The combination in a vacuum type coffee maker of upper and lower chambers, said upper chamber having a bottom and a conduit leading substantially vertically therefrom, said upper chamber also having a pair of annular steps, inwardly stepped from top to bottom, a plate positioned on the lower of said steps, said plate having a concave upper surface, an upper plate positioned on the upper of said steps and having a plane lower surface, and a filter paper interposed between said plates and seating at its edges on the upper of said steps, said plates each having a solid portion directly above said conduit and a plurality of perforations, the perforations of the two plates being offset and arranged in such manner that they cannot be brought into registration.

7. The combination in a vacuum type coffee maker of upper and lower chambers, means for conducting liquid between said chambers, a filter paper spanning the path of the liquid between said chambers, and means for supporting said paper against displacement and rupture upon passage of liquid in either direction comprising a lower perforate plate seated below said filter, an upper perforate plate loosely seated in the upper container above said filter and having a perforate bottom, annular upstanding walls, and a central knob for handling the same, and a bayonet connection between said upper chamber and said walls arranged to allow limited movement of the upper plate but retaining the same from permanent displacement.

8. The combination in a vacuum type coffee maker of upper and lower chambers, means for conducting liquid between said chambers, a filter paper spanning the path of the liquid between said chambers, and a pair of perforate plates positioned on opposite sides of said paper arranged to support the paper therebetween, said plates having perforations staggered in a radial direction, and one of said plates having a concave surface facing said paper forming a narrow distributing space therebetween, whereby to prevent rupture of the paper upon passage of liquid therethrough.

9. The combination in a vacuum coffee maker having upper and lower chambers, means for conducting liquid between said chambers, and a filter sheet spanning the path of the liquid between said chambers, of means for supporting said sheet during filtration comprising a relatively thick plate having a multitude of small perforations therethrough, said plate being concave on a radius of such length that the curvature is difficult to detect on casual observation, for contact of the filter sheet, the opposed sides of said plate being substantially identical in curvature whereby said plate may be positioned in the coffee maker with either face uppermost.

10. The combination in a vacuum type coffee maker of upper and lower chambers, said upper chamber having a plurality of annular steps adjacent the bottom thereof, a plurality of perforate plates positioned on said steps, the plates being of increasing size from bottom to top, a filter paper positioned between said plates, and a conduit to conduct liquid from the lower chamber to the bottom of the upper chamber, the bottom plate being devoid of perforations in the entire area directly opposite the end of said conduit to deflect the entire flow of fluid from the conduit and break the velocity of the liquid.

GEORGE BROWNING.